United States Patent
Schut et al.

[15] 3,689,555
[45] Sept. 5, 1972

[54] NORBORNYLAMINOACETANILIDES

[72] Inventors: Robert N. Schut, Edwardsburg, Mich.; Gust Nichols, Elkhart, Ind.

[73] Assignee: Miles Laboratories, Inc., Elkhart, Ind.

[22] Filed: Dec. 3, 1970

[21] Appl. No.: 94,999

[52] U.S. Cl..........260/558 A, 260/559 R, 260/562 B, 260/570.5 CA, 424/324
[51] Int. Cl..............................................C07c 103/30
[58] Field of Search..............................260/558, 559

[56] References Cited
UNITED STATES PATENTS 3,223,700    12/1965    Klavehn et al.............260/557

*Primary Examiner*—Henry R. Jiles
*Assistant Examiner*—Harry I. Moatz
*Attorney*—Joseph C. Schwalbach, Louis E. Davidson, Harry T. Stephenson and George R. Caruso

[57] ABSTRACT

Certain substituted norbornylaminoacetanilides and their acid addition salts are disclosed as new compounds which are useful as analgesics.

6 Claims, No Drawings

NORBORNYLAMINOACETANILIDES

SUMMARY OF THE INVENTION

The present invention is concerned with compounds of the formula A:

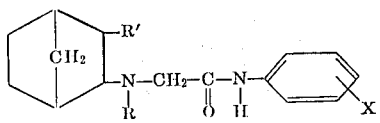

and acid addition salts thereof wherein R is hydrogen or lower-alkyl of from one to four carbon atoms, R' is phenyl, halophenyl or alkoxyphenyl in which halo includes chlorine, bromine, iodine or fluorine and alkoxy includes methoxy, ethoxy, propoxy and butoxy, and X is halogen, hydroxy or alkoxy. These compounds are useful as analgesics when administered orally to animals at a dosage of 60 mg./kg. or more and have no noticeable side effects.

These novel compounds are readily prepared by refluxing equimolar amounts of a substituted norbornylamine of the Formula B:

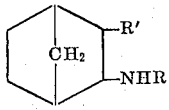

and a haloacetanilide of the Formula C:

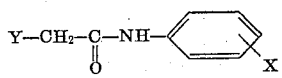

wherein Y is a halogen and R, R' and X are as previously defined. The reaction proceeds best in a polar solvent such as isopropyl alcohol and in the presence of a catalytic amount of potassium iodide. An inorganic base such as sodium bicarbonate can be conveniently used to neutralize the acid formed in the reaction. Upon completion of the reaction, water is added, the solvent is evaporated and the residue extracted with chloroform. The free base thus formed is recovered by concentrating the extract and thereafter dissolved in an ether or acetone-isopropyl alcohol mixture containing HCl or HBr to obtain the hydrochloride or hydrobromide which precipitates and is isolated as a white solid by filtration.

The norbornylamines employed as starting materials are known or can be prepared by known methods as described in J.A.C.S., 61, 521 (1939) or J.A.C.S., 73, 5068 (1951). The primary amines thus prepared can be alkylated as set forth in German Pat. Nos. 1,110,159 and 1,110,160. All the haloacetanilides employed herein are known compounds.

PREFERRED EMBODIMENTS

EXAMPLE 1

R is methyl, R' is phenyl and X is p-fluoro in Formula A.

A mixture of 4.94 grams (0.015 mole) of N-methyl-3-phenyl-2-norbornylamine hydroiodide, 2.81 grams (0.015 mole) of α-chloro-p-fluoroacetanilide and 5 grams of NaHCO$_3$ in 150 ml. of isopropyl alcohol containing 10 ml. of water was heated under reflux for 16 hours. The reaction mixture was then cooled, 300 ml. of water was added and the isopropyl alcohol was evaporated under vacuum. The residue was extracted with chloroform, dried and concentrated to yield 5.2 grams of α-[N-methyl-N-(3-phenyl-2-norbornyl)]amino-p-fluoroacetanilide as the free base which was identified by its infrared spectrum. The free base was dissolved in 100 ml. of ether and 10 ml. of 1.8 normal hydrochloric acid in isopropanol was added. The hydrochloride precipitated as a white solid and was found to melt at 252° C. Upon analysis this salt contained 7.06 percent nitrogen compared to the theoretical amount of 7.20 percent nitrogen.

EXAMPLE 2

R is methyl, R' is phenyl and X is p-hydroxy in Formula A.

A mixture of 4.94 grams (0.015 mole) of N-methyl-3-phenyl-2-norbornylamine hydrochloride and an equal amount of α-chloro-p-hydroxyacetanilide was refluxed overnight with 5 grams of sodium bicarbonate and 150 ml. of isopropyl alcohol. The reaction mixture was treated as described in Example 1 to obtain α-[N-methyl-N-(3-phenyl-2-norbornyl)]amino-p-hydroxy acetanilide as the solid free base which was converted to the hydrochloride as previously described in a yield of 3.10 grams. The hydrochloride melted at 273° C. with decomposition and contained 7.11 percent nitrogen versus 7.24 percent nitrogen calculated.

EXAMPLE 3

R is ethyl, R' is phenyl and X is p-ethoxy in Formula A.

To a mixture of 2.53 grams (0.01 mole) of N-ethyl-3-phenyl-2-norbornylamine hydrochloride (melting at 222° C.) in 125 ml. of 2-propanol was added 4 grams of NaHCO$_3$ and 2 grams of potassium iodide followed by 2.15 grams of α-chloro-p-ethoxyacetanilide. Ten ml. of water was added and the mixture heated under reflux overnight. The free base was isolated as described in Example 1 and converted to the hydrochloride of α-[N-ethyl-N-(3-phenyl-2-norbornyl)]amino-p-ethoxyacetanilide in a yield of 3.01 grams as a white solid with a melting point of 226° C. which analyzed 6.46 percent nitrogen compared to 6.53 percent nitrogen calculated.

In like manner, 3-halophenyl-2-norbornylamines or 3-alkoxyphenyl-2-norbornylamines can be reacted with an appropriate α-haloacetanilide of Formula C to obtain other compounds of Formula A considered to be within the the scope of the present invention. The free bases of these compounds are readily converted and can be conveniently isolated as pharmaceutically acceptable acid addition salts by methods well known to those skilled in the art of chemistry.

What is claimed is:

1. A compound of the formula:

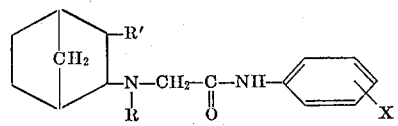

in which R is a member of the group consisting of hydrogen and loweralkyl of form one to four carbon atoms, R' is a member of the group consisting of phenyl, halophenyl and alkoxyphenyl wherein the alkoxy radical contains from one to four carbon atoms and X is a member of the group consisting of halogen, hydroxy and alkoxy containing from one to four carbon atoms and a pharmaceutically acceptable acid addition salt thereof.

2. A compound as in claim 1 in which R is methyl, R' is phenyl and X is p-fluoro.

3. A compound as in claim 1 in which R is methyl, R' is phenyl and X is p-hydroxyl.

4. A compound as in claim 1 in which R is ethyl, R' is phenyl and X is p-ethoxy.

5. An acid addition salt of a compound as in claim 1.

6. A hydrochloride of a compound as in claim 1.

* * * * *

PO-1050
(5/69)

UNITED STATES PATENT OFFICE
CERTIFICATE OF CORRECTION

Patent No. 3,689,555　　　　　　　Dated September 28, 1972

Inventor(s) Robert N. Schut and Gust Nichols

It is certified that error appears in the above-identified patent and that said Letters Patent are hereby corrected as shown below:

In the Claims, column 2, line 65, claim 1, "form" should read --from--.

Signed and sealed this 22nd day of May 1973.

(SEAL)
Attest:

EDWARD M. FLETCHER, JR.　　　　　　ROBERT GOTTSCHALK
Attesting Officer　　　　　　　　　Commissioner of Patents